Figure 1:
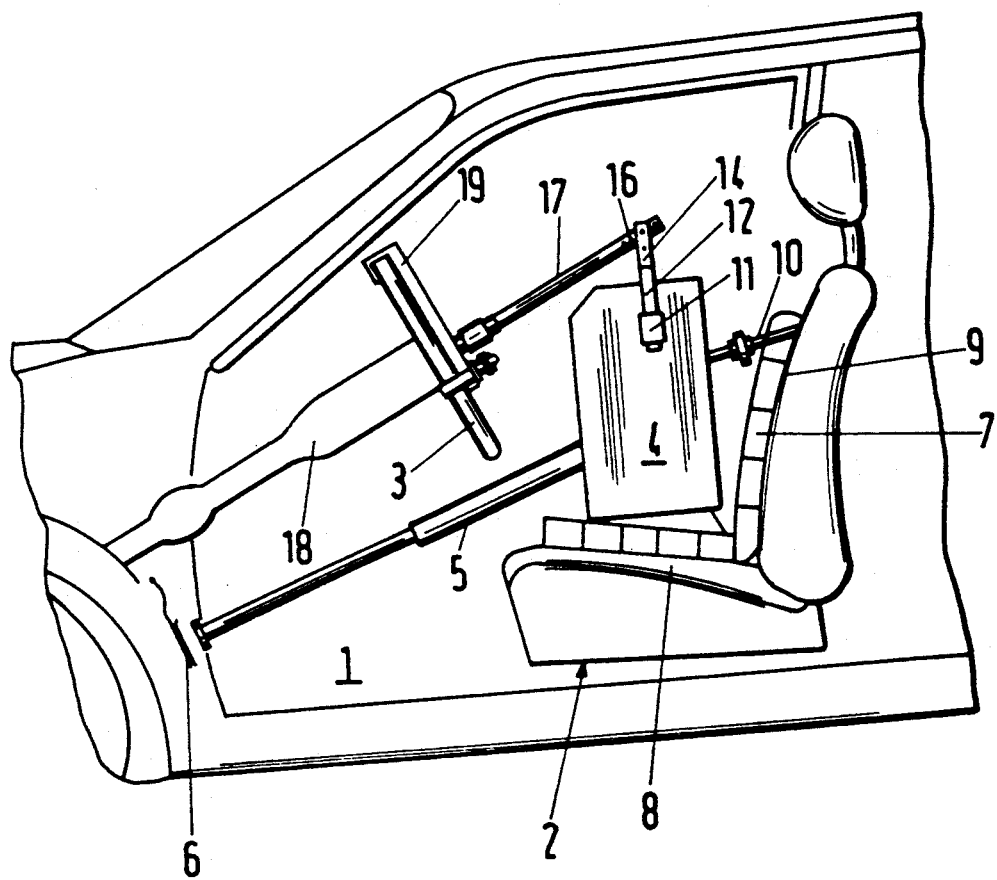

United States Patent [19]
Witt

[11] Patent Number: 5,172,589
[45] Date of Patent: Dec. 22, 1992

[54] ROBOT DRIVER

[76] Inventor: Georg Witt, Helmstedter Strasse 58 H, 3300 Braunschweig, Fed. Rep. of Germany

[21] Appl. No.: 721,573
[22] PCT Filed: Dec. 7, 1990
[86] PCT No.: PCT/DE90/00953
  § 371 Date: Aug. 2, 1991
  § 102(e) Date: Aug. 2, 1991
[87] PCT Pub. No.: WO91/09290
  PCT Pub. Date: Jun. 27, 1991

[30] Foreign Application Priority Data
Dec. 8, 1989 [DE] Fed. Rep. of Germany ....... 3940588

[51] Int. Cl.⁵ .................................. G01M 19/00
[52] U.S. Cl. ............................. 73/132; 901/50
[58] Field of Search ................ 73/132, 116, 117; 901/1, 9, 44, 45, 46, 50; 74/469; 180/316

[56] References Cited

U.S. PATENT DOCUMENTS

| | | | |
|---|---|---|---|
| 3,465,577 | 9/1967 | Donovan | 73/116 |
| 3,713,332 | 1/1973 | Herrbrich | 73/117 |
| 3,886,788 | 6/1975 | Jeter, Jr. | 73/117 |
| 3,889,527 | 6/1975 | Wallace | 73/118 |
| 3,999,425 | 12/1976 | Collin | 75/116 |
| 4,046,262 | 9/1977 | Vykukal et al. | 214/1 |
| 4,495,801 | 1/1985 | Sugimoto | 73/117 |
| 4,742,720 | 5/1988 | Storck | 73/865.9 |

FOREIGN PATENT DOCUMENTS

| | | |
|---|---|---|
| 0235333A1 | 9/1987 | European Pat. Off. . |
| 0235333B1 | 9/1987 | European Pat. Off. . |
| 0236518A1 | 9/1987 | European Pat. Off. . |
| 2204979 | 8/1971 | Fed. Rep. of Germany . |
| 3303588A1 | 8/1983 | Fed. Rep. of Germany . |
| 3744631A1 | 8/1989 | Fed. Rep. of Germany . |
| 56-107145 | 8/1981 | Japan . |

*Primary Examiner*—Jerry W. Myracle
*Attorney, Agent, or Firm*—Foley & Lardner

[57] ABSTRACT

A robot driver for a motor vehicle, which has a central casing (4) to be mounted in the passenger compartment (1) and actuating elements (5) for pedals (6) and, if appropriate, gear lever, can be mounted in the passenger compartment in a stable and uncomplicated way and without the risk of damage in that the casing is supported on the seating surface and back rest surface (8,9) of the driver's seat (2) and is connected to a rod (17) which is held on a steering wheel frame (19) mounted on the steering wheel (3) and is flush with the center of the steering column (18).

25 Claims, 2 Drawing Sheets

ROBOT DRIVER

DESCRIPTION

The invention relates to a robot driver for a motor vehicle which has a central casing to be mounted in the passenger compartment and actuation elements for accelerator pedal, brake/or clutch as well as gear lever.

It is known that the functional monitoring of motor vehicles, in particular also the monitoring of exhaust gas values can take place on roller dynamometers with the aid of robot drivers which, in comparison with a human driver, ensure the advantage of an exactly controllable program execution and a relatively small spread of the measured values. Numerous embodiments of robot drivers of this kind are therefore in use.

It is known to mount the central casing on which the actuation elements for accelerator pedal, brake, if appropriate clutch, as well as gear lever on the anchoring fixture of the driver's seat after the driver's seat is removed. The assembly cost connected with this is considerable so that an embodiment of this kind did not gain acceptance.

By means of a previously used driving robot which was manufactured by the Applicant and operated by WECO Industrietechnik GmbH and documented in a brochure of this company under the title "WECO Industrietechnik—WECO driver robot", it is known to mount the central casing of the robot driver on the driver's seat by the casing being supported on the one hand on the back rest and on the seating surface of the passenger seat and, on the other hand, engaging with holding plates over the outer edges of the seat upholstery. This method of mounting has been well tried per se, but with the increasing application of technology to seats it comes up against difficulties because the sides of the seat surfaces ar covered with operating and/or control elements so that the mounting of holding plates is no longer possible—at least not readily possible.

In EP 0 235 333 B1 a robot driver is described, the central casing of which is supported in the foot space of the driver's seat engaging below the seat on the floor of the passenger compartment and is mounted at its top with an adjustable linkage on the steering wheel by making a connection at the lower apex of the steering wheel which permits the steering wheel to rotate. For this purpose a platform is mounted on the steering wheel, which platform has grooves running in the circumferential direction and open towards the bottom, in which grooves guide elements of the linkage emerging from the casing can engage in order to permit the casing to be fixed relative to the steering wheel. This arrangement has considerable disadvantages. These consist in particular in the fact that a secure support with a large support surface on the floor of the passenger compartment with the driver's seat still present is usually not possible and that the steering wheel rim is loaded with reaction forces which can reach the limits of the loadability of the steering wheel rim. Depending on the stability of the steering wheel rim, it can deform to a greater or lesser extent and thus unreliability during the positioning of the robot driver and thus inaccuracy when actuating the pedals and levers of the motor vehicle can result.

The object of the present invention is based on the problem of achieving a mount for a robot driver in a motor vehicle which does not require removal of the driver's seat, does not create stability problems and does not depend on the material of the steering wheel rim.

Starting from this definition of a problem, a driver robot according to the invention having the features mentioned at the beginning has the further features that the casing is supported on the seating surface and back surface of the driver's seat and is connected to a rod which is held on the steering wheel frame mounted on the steering wheel and is flush with the steering axle.

In accordance with EP 0 235 333, the driver robot is supported on the steering wheel of the motor vehicle. The central casing of the driver robot is however not arranged in the foot space but rather on the driver's seat so that the mounting of the driver robot according to the invention occurs, on the one hand, on the driver's seat and, on the other hand, on the steering wheel. In order to become independent of the stability of the steering wheel and not to load the steering wheel rim with the reaction forces, the gripping forces are transmitted to the steering wheel with a rod which is flush with the steering axle so that support is provided on the stable steering axle and the steering wheel is loaded with the reaction forces centrally in a continuation of the steering axle. The arrangement of the central casing of the robot driver on the driver's seat permits a connection to be made to the rod, which continues the steering axle, by means of relatively short lever arms.

In order to match the system to various vehicle types, it is expedient if the connection of the robot driver to the rod can be made at different distances from the steering wheel plane. For this purpose, the rod can have in a simple embodiment at its free end a multiplicity of passage holes through which a connection pin which is coupled to the central casing by means of a connection linkage and can have, for example, a U-shape can be inserted.

The steering wheel frame is preferably mounted and centered with adjustable clamping devices on the top and laterally on the steering wheel. The clamping devices should have such a clamping range that mounting of the steering wheel frame on all diameters of currently available steering wheels is possible.

In an expedient embodiment, the steering wheel frame has a plate which crosses the steering axle and is provided with a receptacle for the rod. The connection of the rod to the receptacle can occur using a bayonet closure which maintains the connection to the roller meter even in the event of a slight steering wheel movement, which may be necessary, for the purpose of centering the vehicle.

A rotation of the central casing is prevented in that a connection, preferably in the form of a link spanning the top of the casing, is made from both sides of the central casing to the central rod flush with the steering axle, said link having in the center a connecting element to the rod.

In order to become largely independent of the material properties of the upholstery of the driver's seat, it is expedient if a rigid L-shaped seating frame is mounted on the driver's seat and this seating frame bears the central casing.

Figure 2:
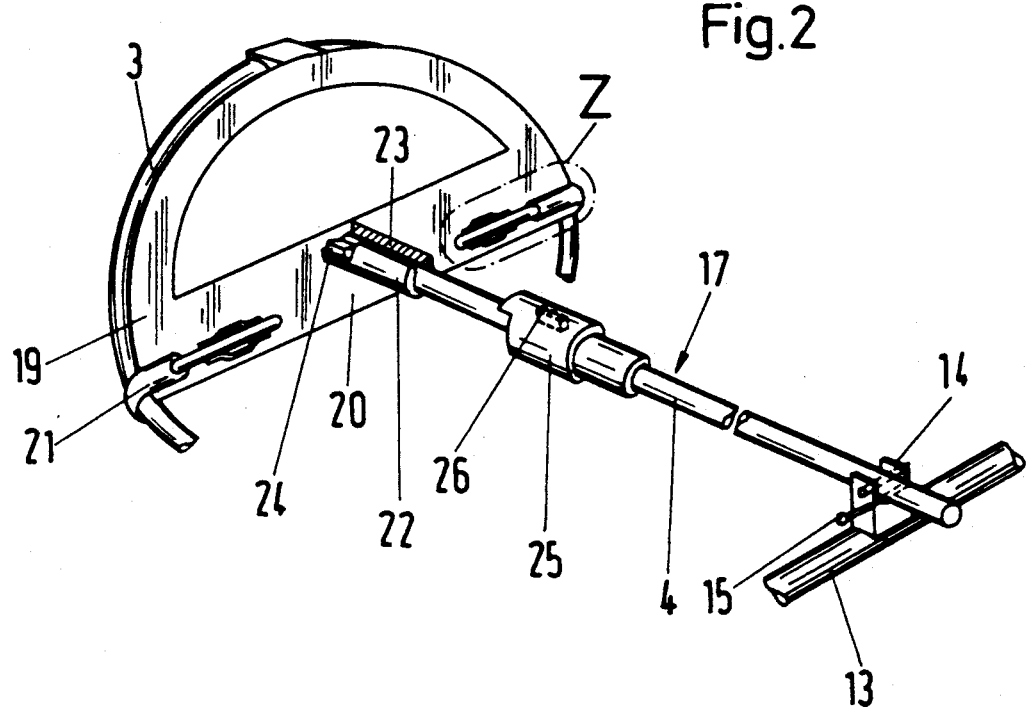
Figure 3:
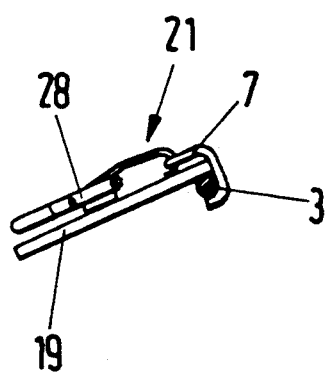

The invention will be described in greater detail below with reference to an exemplary embodiment illustrated in the drawing, in which:

FIG. 1 shows a side view of a robot driver accommodated in the passenger compartment of a motor vehicle and supported on the driver's seat and on the steering wheel FIG. 2 shows a perspective view of a steering wheel frame clamped to the steering wheel and of a rod, which is a continuation of the steering axle, mounted thereon and FIG. 3 shows a side view of a clamping device which engages over the steering wheel rim.

FIG. 1 indicates the passenger compartment 1 of a motor vehicle in the region of the driver's seat 2 and of the steering wheel 3. The robot driver consists of a central casing 4, of which at least one actuation element 5 for actuating pedals 6 and/or a gear lever (not illustrated) of the motor vehicle [lacuna] has.

The central casing 4 is supported via an L-shaped seating frame 7 both on the seating surface 8 and on the back surface 9 of the driver's seat 2. The support on the back surface 9 is provided by means of a longitudinally adjustable support device 10.

Viewed laterally in the driving direction, the central casing 4 has two bushings 11 which receive the two ends of a rotated U-shaped link 12. Mounted in the center of the crossbar 13 of the U-shaped link 12 is a bracket 14 consisting of two upwardly projecting parallel plates which have passage openings for a U-shaped arresting pin 15.

The arresting pin 15 projects through a passage opening 16 of a rod 17 which is aligned in such a way that it is flush with the steering axle 18 of the steering wheel 3, i.e. the steering axle 18 continues on the driver side of the steering wheel 3. The connection of the rod 17 to the steering wheel 3 is made by means of a steering wheel frame 19 which essentially covers the top half of the steering wheel 3 and is closed off towards the bottom with a plate 20 which spans the steering axle 18. The steering wheel frame 19 is connected at three points to the steering wheel 3 and, specifically, at at least two points by means of clamping devices 21, the clamping range of which is designed in such a way that they can be matched to different, customary steering wheel diameters. Mounted on the plate 20 is a hollow-cylindrical receptacle 22 which has a longitudinal slot 23 which widens in a step-shaped manner in the region of the plate 22 in the circumferential direction and thus forms together with a projection 24 of the rod 17 a bayonet closure. The securing of the rod 17 thus brought about permits a rotational movement of the steering wheel 3, as is possibly required for centering the motor vehicle on a roller dynamometer. An arresting sheath 25 which has an inwardly projecting projection 26 in a step-shaped widened portion of the inner diameter can also be secured in the bayonet closure with the aid of the projection and prevents an accidental release of the connection produced between the receptacle 22 and rod 17 by the bayonet closure.

FIG. 3 shows in detail the mounting of the steering wheel frame 19 on the rim of the steering wheel 3 via an essentially U-shaped plate 27 which, with a customary clamping lever 28, forms the clamping device 21.

The mounting according to the invention of the robot driver ensures that reaction forces occurring as a result of the actuation of the pedals 6 are absorbed in the steering axle 18, that is to say in the center of the steering column. Damage to the steering wheel and, in particular to the steering column as a result of reaction forces to be absorbed outside the center, such as those which occur in EP 0 235 333 B1, are thus ruled out.

I claim:

1. Robot driver for a motor vehicle having a passenger compartment, the robot driver comprising:

a central casing being mounted in the passenger compartment;

actuation element operatively connected to pedals of the motor vehicle;

a driver's seat having a seating surface and a back rest surface, the central casing being supported on the seating and back rest surfaces;

a steering wheel frame being mounted to a steering wheel of the motor vehicle;

a rod being connected to the central casing and to the steering wheel frame such that it is flush with the center of a steering column of the motor vehicle.

2. Robot driver according to claim 1, wherein the rod (17) has a plurality of connection points at different distances from the steering wheel plane for connecting the rod to the central casing.

3. Robot driver according to claim 2, in which the rod (17) has a free end having a multiplicity of passage holes (16) and further comprising a connection pin (15) passing through one of said plurality of holes and a connection linkage (12, 13, 14) which couples the pin to the central casing (4).

4. Robot driver according to claim 3, further comprising adjustable clamping devices (21) for mounting and centering the steering wheel frame (19) on the top and laterally on the steering wheel (3).

5. Robot driver according to claim 3, in which the steering wheel frame (19) has a plate (20) which crosses the steering column (18), the plate having a receptacle (22) for receiving the rod (17).

6. Robot driver according to claim 3, in which the connection linkage (12,13,14) is mounted on both sides on the central casing (4), spans the top of the casing in the form of a link (12) and has in its center a connecting element (14) for connection to the rod (17).

7. Robot driver according to claim 3, further comprising a rigid L-shaped seating frame (7) which is mounted on the driver's seat (2) and supports the central casing (4).

8. Robot driver according to claim 2, further comprising adjustable clamping devices (21) for mounting and centering the steering wheel frame (19) on the top and laterally on the steering wheel (3).

9. Robot driver according to claim 2, in which the steering wheel frame (19) has plate (20) which crosses the steering column (18), the plate having a receptacle (22) for receiving the rod (17).

10. Robot driver according to claim 2, further comprising a connection linkage which is mounted on both sides on the central casing (4), and wherein the connection linkage spans the top of the central casing in the form of a link (12), and has in its center a connecting element (14) for connection to the rod (17).

11. Robot driver according to claim 2, further comprising a rigid L-shaped seating frame (7) which is mounted on the driver's seat (2) and supports the central casing (4).

12. Robot driver according to claim 1, further comprising adjustable clamping devices (21) for mounting and centering the steering wheel frame (19) on the top and laterally on the steering wheel (3).

13. Robot driver according to claim 12, in which the steering wheel frame (19) has a plate (20) which crosses the steering column (18), a plate having a receptacle (22) for receiving the rod (17).

14. Robot driver according to claim 12, further comprising a connection linkage (12,13,14) which is mounted on both sides on the central casing (4), and wherein the connection linkage spans the top of the central casing in the form of a link (12), and has in its center a connecting element (14) for connection to the rod (17).

15. Robot driver according to claim 12, further comprising a rigid L-shaped seating frame (7) which is mounted on the driver's seat (2) and supports the central casing (4).

16. Robot driver according to claim 1, in which the steering wheel frame (19) has plate (20) which crosses the steering column (18), the plate having a receptacle (22) for receiving the rod (17).

17. Robot driver according to claim 16 further comprising a bayonet closure (23,24) for arresting the rod (17) in the receptacle (22).

18. Robot driver according to claim 17, further comprising a connection linkage (12,13,14) which is mounted on both sides on the central casing (4), and wherein the connection linkage spans the top of the central casing in the form of a link (12), and has in its center a connecting element (14) for connection to the rod (17).

19. Robot driver according to claim 17, further comprising a rigid L-shaped seating frame (7) which is mounted on the driver's seat (2) and supports the central casing (4).

20. Robot driver according to claim 16, further comprising a connection linkage (12,13,14) which is mounted on both sides on the central casing (4), and wherein the connection linkage spans the top of the central casing in the form of a link (12), and has in its center a connecting element (14) for connection to the rod (17).

21. Robot driver according to claim 16, further comprising a rigid L-shaped seating frame (7) which is mounted on the driver's seat (2) and supports the central casing (4).

22. Robot driver according to claim 1, further comprising a connection linkage (12, 13, 14) which is mounted on both sides on the central casing (4), and wherein the connection linkage spans the top of the central casing in the form of a link (12), and has in its center a connecting element (14) for connection to the rod (17).

23. Robot driver according to claim 22, further comprising a rigid L-shaped seating frame (7) which is mounted on the driver's seat (2) and supports the central casing (4).

24. Robot driver according to claim 1, further comprising a rigid L-shaped seating frame (7) which is mounted on the driver's seat (2) and supports the central casing (4).

25. Robot driver according to claim 1, wherein at least one of the actuation elements is operatively connected to a gear lever of the motor vehicle.

* * * * *